United States Patent
Foreman et al.

(10) Patent No.: US 7,547,396 B2
(45) Date of Patent: Jun. 16, 2009

(54) THICKENER/CLARIFIER FEEDWELL ASSEMBLY WITH FROTH DISSIPATION

(75) Inventors: Don J. Foreman, Hawkestone (CA); Dennis MacGillivray, Brantford (CA); Fred Schoenbrunn, Salt Lake City, UT (US)

(73) Assignee: FLSmidth Technology A/S, Valby (DK)

( * ) Notice: Subject to any disclaimer, the term of this patent is extended or adjusted under 35 U.S.C. 154(b) by 79 days.

(21) Appl. No.: 11/975,958

(22) Filed: Oct. 23, 2007

(65) Prior Publication Data
US 2008/0110839 A1    May 15, 2008

Related U.S. Application Data

(60) Provisional application No. 60/854,334, filed on Oct. 25, 2006.

(51) Int. Cl.
  *B01D 21/24* (2006.01)
(52) U.S. Cl. .................. 210/800; 210/519; 210/525; 210/528; 210/541; 137/561 R; 405/119
(58) Field of Classification Search .................. 210/154, 210/162, 512.1, 519, 525, 528, 541, 800, 210/801; 96/179; 137/561 R; 405/118, 405/119
See application file for complete search history.

(56) References Cited

U.S. PATENT DOCUMENTS

| | | | | |
|---|---|---|---|---|
| 159,959 A | * | 2/1875 | Parker | 403/119 |
| 1,699,948 A | * | 1/1929 | Biedermann | 405/119 |
| 2,184,195 A | * | 12/1939 | Naucler | 96/179 |
| 2,936,074 A | * | 5/1960 | Forshee | 210/162 |
| 3,006,474 A | * | 10/1961 | Fitch | 210/512.1 |
| 3,542,207 A | * | 11/1970 | Stansmore | 210/528 |
| 4,278,541 A | | 7/1981 | Eis et al. | |
| 4,659,458 A | * | 4/1987 | Chin et al. | 210/776 |
| 5,089,118 A | * | 2/1992 | Mahoney | 210/525 |
| 5,147,556 A | * | 9/1992 | Taylor | 210/519 |
| 5,389,250 A | | 2/1995 | Wood et al. | |
| 5,944,995 A | * | 8/1999 | Sethi et al. | 210/519 |
| 6,475,383 B2 | * | 11/2002 | Deskins | 210/528 |

* cited by examiner

*Primary Examiner*—Christopher Upton
(74) *Attorney, Agent, or Firm*—Coleman Sudol Sapone, PC; Michael Polacek, Esq.

(57) ABSTRACT

A feedwell assembly for a thickener/clarifier including a feedwell body, at least one feed channel connected at a downstream end to the body, and a plate member disposed in the feed channel for separating froth from an incoming slurry stream to where the separated froth may be dissipated by a liquid spray directed onto the plate member. The plate member may include a planar upstream portion inclined upwardly from an upstream end of the plate member and may further include a planar downstream portion inclined downwardly from a downstream end of the upstream portion. At least one spray nozzle may be disposed above an elevated portion of the plate member so as to direct a liquid spray onto the plate member in a region about the joint, for further dissipating froth guided onto the plate member.

23 Claims, 4 Drawing Sheets

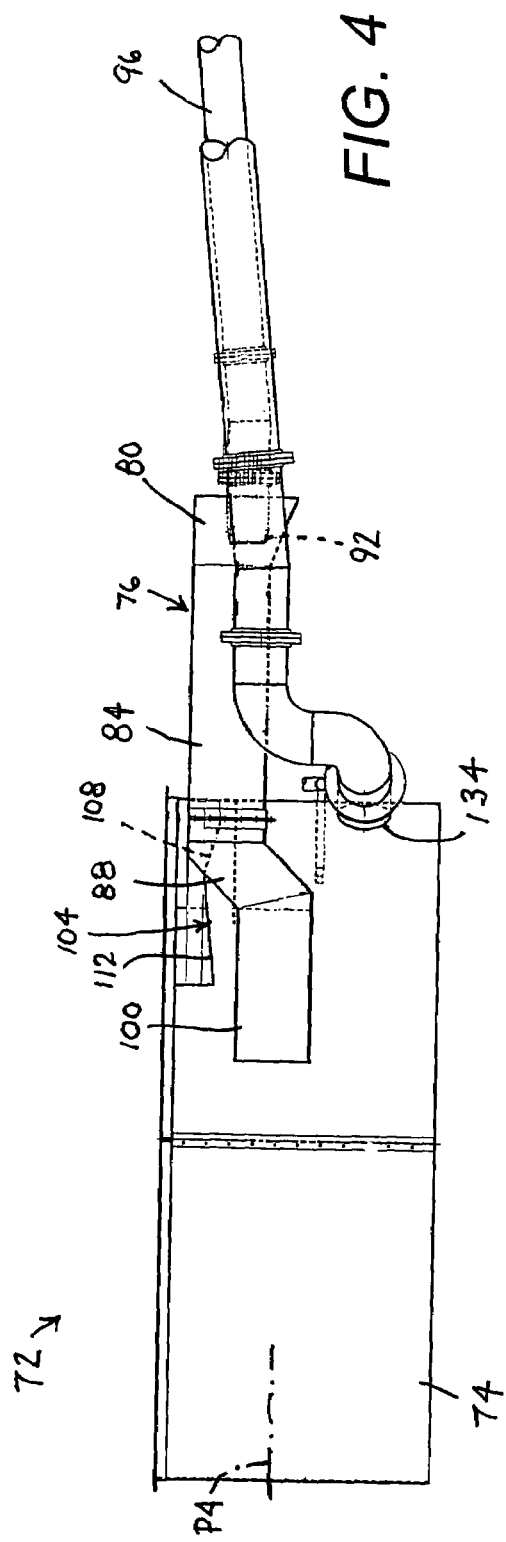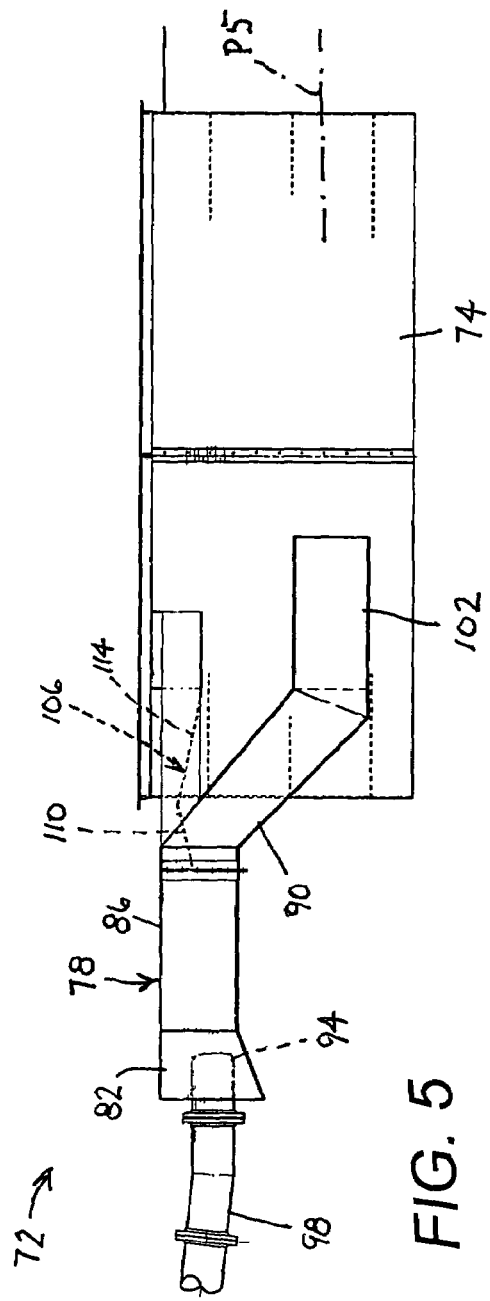

THICKENER/CLARIFIER FEEDWELL ASSEMBLY WITH FROTH DISSIPATION

CROSS-REFERENCE TO RELATED APPLICATION

This application claims the benefit of U.S. Provisional Patent Application No. 60/854,334 filed Oct. 25, 2006.

BACKGROUND OF THE INVENTION

This invention relates to thickener/clarifier tanks used to separate liquid and solids components of an influent feed slurry and specifically relates to feedwell apparatus employed in such thickener/clarifiers to enhance the clarification process.

Thickener/clarifier tanks are used in a wide variety of industries to separate influent feed slurry comprising a solids- or particulate-containing fluid to produce a "clarified" liquid phase having a lower concentration of solids than the influent feed slurry and an underflow stream having a higher concentration of solids than the influent feed slurry. Thickener/clarifier tanks conventionally comprise a tank having a floor and a continuous wall, which define a volume within which the clarification process takes place. Thickener/clarifier tanks also include an influent feed pipe for delivering influent feed to the tank, an underflow outlet for removing settled solids from the tank and a fluid discharge outlet for directing clarified liquid away from the tank. Thickener/clarifier tanks may also include a rake assembly having rake arms for sweeping along the floor of the tank, and may include an overflow launder or bustle pipe for collecting clarified liquid near the top of the tank.

Thickener/clarifier tanks of the type described operate by introducing an influent feed stream into the volume of the tank where the influent is retained for a period long enough to permit the solids to settle out by gravity from the fluid. The solids that settle to the bottom of the tank produce a sludge bed near the bottom of the tank, which is removed through the underflow outlet. Clarified liquid is formed at or near the top of the thickener/clarifier tank and is directed away from the tank for further processing or disposal. Settling of solids may be enhanced in some applications by the addition of a flocculent or polymer that forms agglomerates that settle more readily. In many applications, an objective of fluid clarification is to enhance the settling process to achieve a high throughput of solids, and thereby enhance solids recovery.

Many thickener/clarifier tanks are constructed with a feedwell, usually centrally located within the tank, into which the influent feed stream is delivered. The feedwell generally serves the purpose of reducing the fluid velocity of the incoming influent feed stream so that the energy in the stream may be dissipated to some degree before entering the tank. Dissipation of energy in the influent feed stream lessens the disruptive effect that the incoming influent feed has on the settling rate of the solids in the tank. In other words, introduction into a thickener/clarifier of an influent feed stream under high fluid velocity tends to cause turbulence in the tank and compromises the settling rate of solids. A feedwell may be structured in a variety of ways, therefore, to create or enhance dissipation of energy in the influent feed. For example, the feedwell and influent feed pipe may be structured to introduce influent feed to the feedwell at two opposing directions and into an annular space, such as is disclosed in U.S. Pat. No. 4,278,541 to Eis, et al.

Froth and/or air in a thickener/clarifier feed stream in existing methods of feedwell entry unavoidably contacts the flocculent and results in air being locked into the flocculated solids structure. This material then is slow to settle and is more persistent on the tank surface with resultant loss of solids to overflow and poor settling efficiency.

OBJECTS OF THE INVENTION

It is an object of the present invention to provide an improved feedwell assembly for thickener/clarifiers.

A more specific object of the present invention is to provide a feedwell assembly wherein the incidence of froth or air in a thickener/clarifier feed stream is reduced.

An even more specific object of the present invention is to provide a feedwell assembly wherein the incidence of froth or air in a thickener/clarifier feed stream is reduced prior to contact of the feed stream with a flocculent.

Yet another object of the present invention is to provide such a feedwell assembly wherein froth and air reduction is accomplished inexpensively and simply.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A feedwell assembly for a thickener/clarifier comprises, in accordance with the present invention, a feedwell body, at least one feed channel connected at a downstream end to the body, and a plate member disposed in the feed channel for separating froth from an incoming slurry stream. Optionally a liquid spray directed onto the plate member may dissipate the separated froth.

The plate member may be one flat, substantially horizontal or inclined plate section or take the particular form of a plurality of planar plate sections. The plate member may include an upstream portion that may incline upwardly from an upstream end of the plate member and may further include a downstream portion inclined downwardly from a downstream end of the upstream portion. The plate member has a leading edge that is disposed at a froth-liquid interface.

In one embodiment of the present invention, the upstream portion and the downstream portion of the plate member meet along an elongate joint. At least one spray nozzle may be disposed so as to direct a liquid spray onto at least a portion of the plate member in a region about the joint.

A feedwell assembly for a thickener/clarifier more particularly comprises, in accordance with the present invention, (i) a feedwell body, (ii) a pair of infeed pipes connected at downstream ends to the body at locations spaced longitudinally and circumferentially along the body, (iii) a launder header, the infeed pipes being connected at upstream ends to the header, and (iv) a plate member disposed in the header so that an upstream end of the plate member is disposed approximately at a froth-liquid interface.

Optionally, at least a portion of the plate member is disposed above the liquid level. In that case, the plate member may have an upstream portion that is upwardly inclined from the froth-liquid interface, proceeding in a downstream direction. The inclined upstream portion may be a planar plate section. A second plate section, exemplarily planar, may extend from a downstream end or edge of the inclined upstream portion. The second plate section may extend downwardly.

The separated froth on the plate member naturally dissipates or collapses on its own. However, at least one spray nozzle may be disposed for directing a liquid spray onto at least a portion of the plate member to knock down or further dissipate froth thereon.

Where the plate member includes an upstream plate section inclined upwardly from the upstream end of the plate member and a downstream plate section inclined downwardly from a downstream end of the upstream portion, the plate sections meet along an elongate joint, with the at least one spray nozzle being disposed so as to direct a liquid spray onto at least a portion of the plate member in a region about the joint. The feedwell body may include a lower portion and an upper portion, where the upper portion has a larger transverse dimension (e.g., diameter) that the lower portion. In that case the infeed pipes are connected to the lower portion, while the plate member extends to the upper portion.

A method for reducing froth and air fed to a feedwell in a thickener/clarifier comprises, in accordance with the present invention, (a) disposing, in a feed channel or launder header, a plate member in a position and orientation for separating froth from an incoming slurry stream, (b) attaching the plate member in the position to the feed channel or launder header, and (c) diverting froth from along an upper surface of the slurry onto the plate member, while feeding the slurry separated from the froth through the feedwell feed pipe.

The method may further comprise disposing at least one spray nozzle above the plate member, and ejecting a spray from the nozzle onto the froth on at least a portion of the plate member, thereby collapsing the froth into solids and liquid components and releasing air entrapped in the froth. The separated and collapsed froth may be guided to a feedwell body. Where the feedwell body includes a lower portion and an upper portion, the feed pipe may extend to the lower portion, while the plate member extends to the upper portion. The disposing of the plate member may include positioning the plate member so that an upstream end of the plate member is disposed at or below an operational liquid level in the feed channel or launder header and so that at least a portion of the plate member is disposed above the liquid level.

The disposing of the plate member may further include positioning the plate member so that an upstream portion is inclined upwardly from the upstream end of the plate member and a downstream portion of the plate member is inclined downwardly from a downstream end of the upstream portion.

Where the upstream portion and the downstream portion of the plate member meet along an elongate joint, the disposing of the spray nozzle may includes positioning the spray nozzle so as to enable a directing a liquid spray onto the plate member in a region about the joint.

BRIEF DESCRIPTION OF THE DRAWING

FIG. 4 is an elevational view taken from one side of the feedwell of FIG. 3, in the direction of arrow IV.

FIG. 5 is an elevational view taken from an opposite side of the feedwell of FIG. 3, in the direction of arrow V.

DETAILED DESCRIPTION

Figure 1:
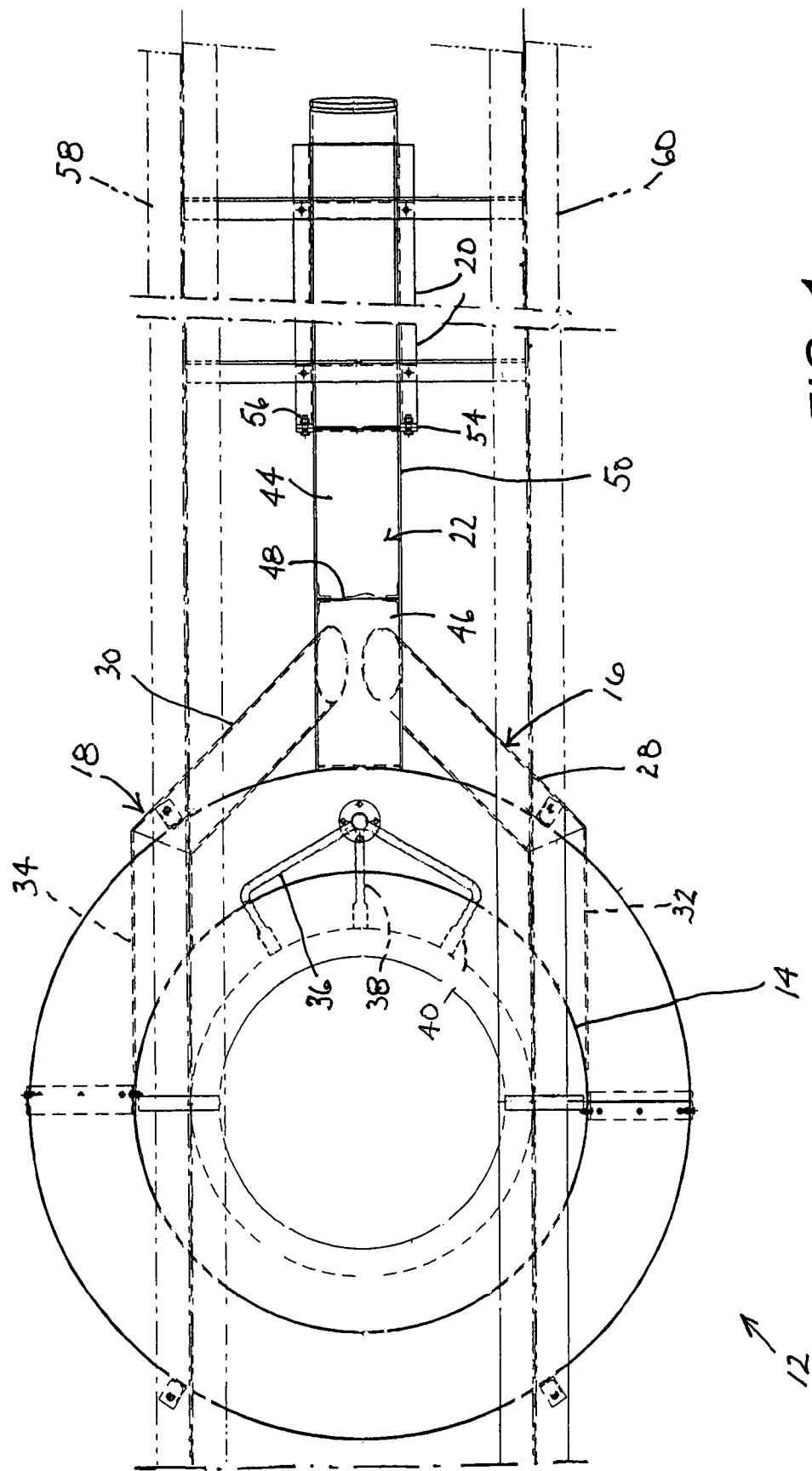
FIG. 1 is a partial top plan view of a feedwell for a thickener/clarifier, in accordance with the present invention.
Figure 2:
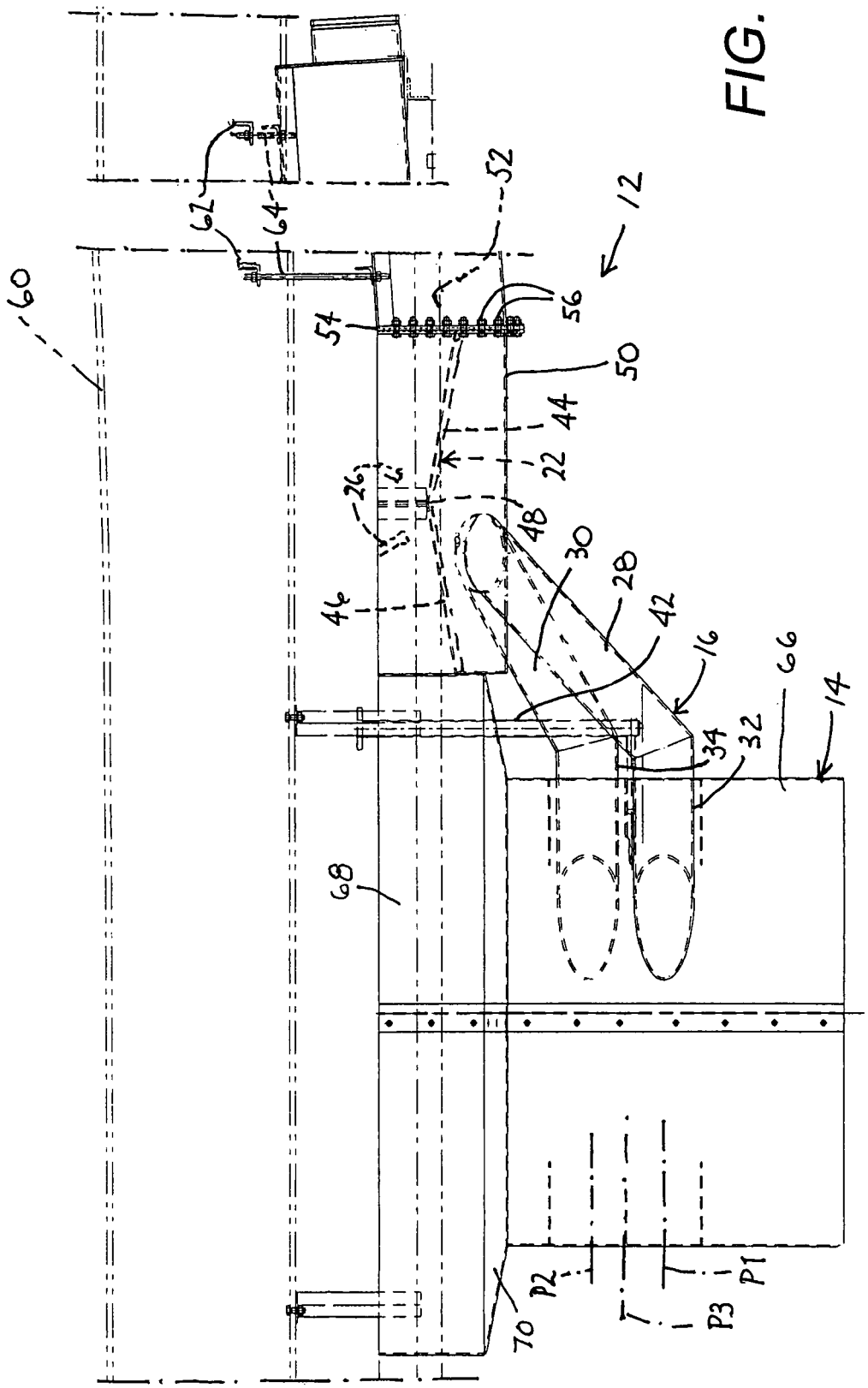
FIG. 2 is a side elevational view of the feedwell of FIG. 1.

As shown in FIGS. 1 and 2, a feedwell assembly 12 for a thickener/clarifier comprises a cylindrical feedwell body 14, a pair of feed pipes 16 and 18 each connected at a downstream end to the body, the feed pipes extending from a feed launder or channel 20, and a plate member 22 disposed at least partially upstream of the feed pipes 16 and 18 for separating froth from an incoming slurry stream guided along feed launder or channel 20. A liquid spray 24 directed onto the plate member by one or more spray nozzles 26 disposed generally above the plate member can dissipate the froth separated by plate member 22.

Feed pipes 16 and 18 each include an angled upstream inlet portion 28 and 30 connected to launder or channel 20 in a region about plate member 22. Feed pipes 16 and 18 each further include a substantially horizontal inlet portion 32 and 34 connected to the respective upstream portion 28 and 30 and extending to feedwell body 14. Horizontal inlet portions 32 and 34 are connected to feedwell body 14 on opposite sides thereof and at staggered elevations, so that slurry enters the feedwell body 14 from feed pipes 16 and 18 traveling in opposed circumferential directions in vertically spaced planes P1 and P2.

Feedwell assembly 12 further includes a triumvirate of flocculent feed pipes 36, 38, 40 extending from a vertical manifold pipe 42 inwardly to feedwell body 14 along a common plane P3 sandwiched between slurry infeed planes P1 and P2.

Plate member 22 includes an upstream portion 44 inclined upwardly from an upstream end of the plate member and further includes a downstream portion 46 inclined downwardly from an elongate linear joint 48 at a downstream end of upstream portion 44. Upstream portion 44 and downstream portion 46 take the particular form of planar plate sections. Spray nozzles 26 are disposed so as to direct liquid spray onto plate member 22 in a region about joint 48.

Accordingly, infeed pipes 16 and 18 are connected at downstream ends to feedwell body 14 at locations spaced longitudinally and circumferentially along the body. Plate member 22 is more particularly located in a launder header 50, the infeed pipes 16 and 18 being connected at upstream ends to the header. Plate member 22 is disposed in header 50 so that an upstream end of the plate member is disposed at or below an operational liquid level 52 in the header and so that at least a portion of the plate member is disposed above the liquid level. Spray nozzles 26 are disposed for directing a liquid spray onto that portion of plate member 22 above the liquid level 52 to knock down or dissipate froth thereon.

Feedwell body 14 includes a lower portion 66 and an upper portion 68. Upper portion 68 has a transverse dimension or diameter that is larger than the corresponding transverse dimension or diameter of lower portion 66, with an annular inclined shelf 70 being provided between an outer wall (not separately designated) of upper portion 68 and an outer wall (not separately designated) of lower portion 66. This allows volume for the froth to accumulate in the feedwell 14 so as to allow time for the froth to dissipate naturally or with sprays so as to keep the froth from escaping to the overflow. The expanded area of upper portion 68 provides a containment area (size can be designed based on perception of the problem) where froth can be accumulated and knocked down as required. The froth solids that leave this zone pass through the floc addition zone where they have an opportunity to be flocculated to further enhance their settling. This expanded zone with or without sprays is optional.

Infeed pipe sections 32 and 34 are connected to lower feedwell body portion 66, while downstream portion 46 of plate member 22 extends to upper feedwell body portion 68.

A related method for reducing froth and air fed to a feedwell in a thickener/clarifier comprises providing plate member 22 and disposing the plate member in feed launder or channel 20 or launder header 50 at least partially upstream of one or more feedwell feed pipes 16 and 18 in a position and orientation for separating froth from an incoming slurry stream. Plate member 22 is attached in that position to feed launder or channel 20 or launder header 50, spray nozzle(s) 26 being positioned above the plate member, particularly in an exposed region of the plate member. During operation of the feedwell assembly 12 (and the associated thickener/clarifier), slurry is directed into feed launder or channel 20 and, optionally, launder header 50 so that froth along an upper surface of the slurry is guided onto plate member 22. A spray is ejected from nozzle(s) 26 onto the froth on plate member 22, thereby collapsing the froth into solids and liquid components and releasing air entrapped in the froth. The slurry is fed in together with the solids and liquid components of the collapsed froth through the one or more feedwell feed pipes 16 and 18.

Plate member 22 is positioned so that an upstream end of the plate member is disposed at or below an operational liquid level 52 in the feed launder or channel 20 or launder header 50 and so that at least a portion of the plate member is disposed above the liquid level. Plate member 22 is preferably positioned so that upstream portion 44 is inclined upwardly from the upstream end of the plate member and a downstream portion 46 of the plate member is inclined downwardly from a downstream end of the upstream portion.

Where upstream portion 44 and downstream portion 46 of plate member 22 meet along elongate joint 48, spray nozzle(s) 26 may be positioned so as to enable a directing a liquid spray onto the plate member in a region about the joint.

Launder or channel 20 is connected to header 50 along a joint 54 by a plurality of bolts and nuts 56. Launder or channel 20 is suspended from bridge girders 58 and 60 by cross support angles 62 and threaded rods 64.

Figure 3:
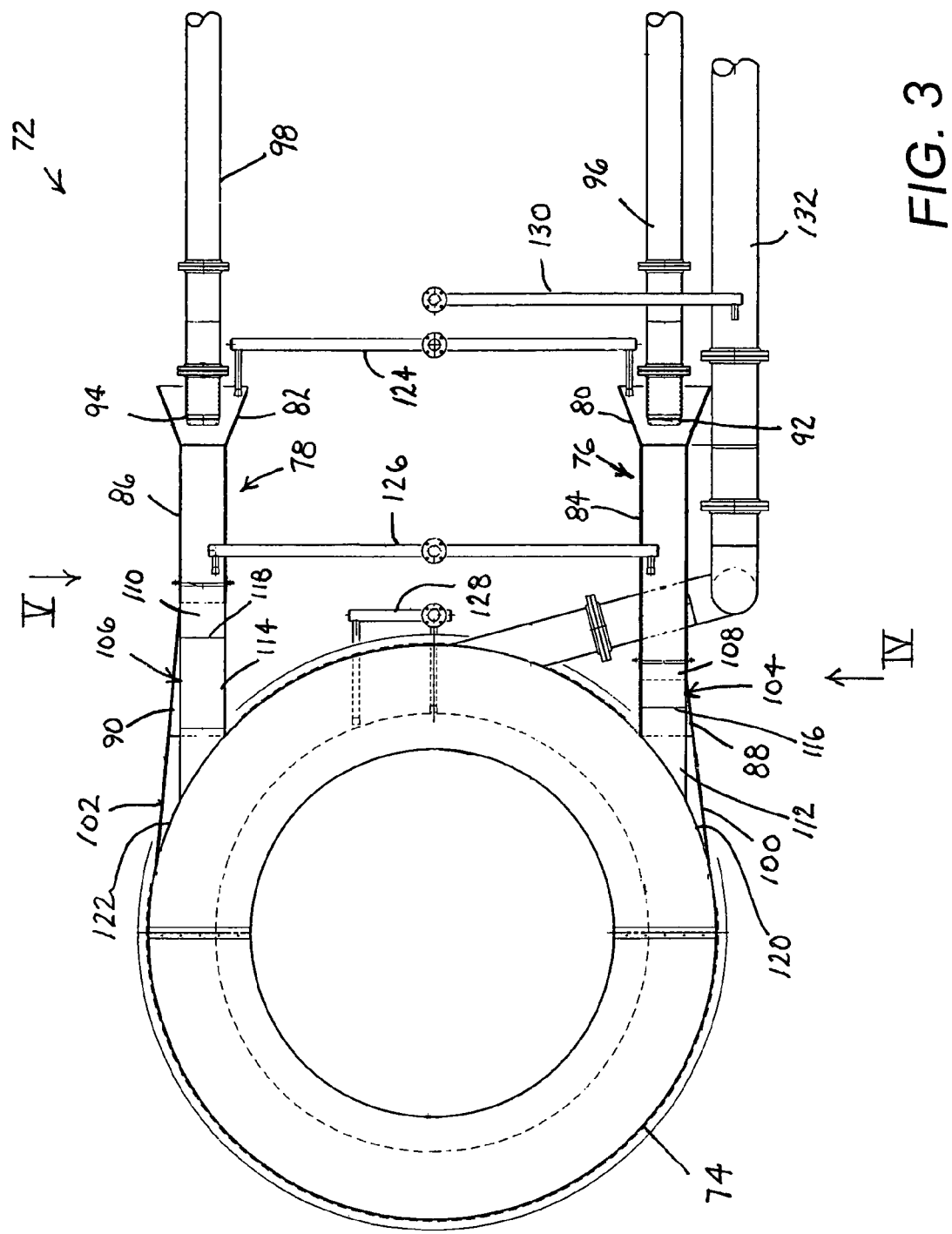
FIG. 3 is a partial top plan view of another feedwell for a thickener/clarifier, in accordance with the present invention.

As depicted in FIGS. 3-5, another feedwell assembly 72 for a thickener/clarifier comprises a cylindrical feedwell body 74 and a pair of eductor feed channels 76 and 78 each connected at a downstream end to the feedwell body. Feed channels 76 and 78 include open-top inlet port sections 80 and 82 having converging walls (not separately designated), open-top middle sections 84 and 86 of reduced and uniform transverse cross-sectional area, and outlet or discharge sections 88 and 90 of diverging walls (not separately designated) and concomitantly increasing cross-sectional area.

Directional nozzles 92 and 94 of thickener feed pipes 96 and 98 are disposed at least partially within inlet port sections 80 and 82 of eductor feed channels 76 and 78. Feed channels 76 and 78 are located below the liquid level of the clarifier tank (not shown) so that liquid at the top of the clarifier tank is entrained to flow with the thickener feed stream through eductor feed channels 76 and 78 into feedwell body 74. As described in U.S. Pat. No. 5,389,250, eductor feed channels 76 and 78 function as jet pumps to educt previously clarified liquor from the clarifier tank of settling basin to dilute the influent feed stream.

As depicted in FIGS. 4 and 5, middle sections 84 and 86 of eductor feed channels 76 and 78 are oriented substantially horizontally, whereas outlet or discharge sections 88 and 90 are downwardly inclined and are provided at their downstream ends with horizontally oriented end portions 100 and 102 that are coupled to feedwell body 74 and serve as inlets thereto. Inlet portions 100 and 102 are connected to feedwell body 74 at staggered elevations, inlet portion 102 being located below inlet portion 100, so that slurry enters the feedwell body 74 from feed channels 76 and 78 traveling in opposed circumferential directions in vertically spaced planes P4 and P5. In accommodating the different vertical heights of eductor end portions 100 and 102, middle section 84 of eductor feed channel 76 is longer than middle section 86 of eductor feed channel 78, and discharge section 90 is longer than discharge section 88.

Eductor feed channels 76 and 78 are provided with respective froth-separation plates 104 and 106 disposed at least partially upstream of inclined discharge sections 88 and 90 for separating froth from incoming slurry (diluted thickener) streams guided along middle sections 84 and 86 of the eductor feed channels. Nozzles (not shown) may direct liquid spray onto plates 104 and 106 for dissipating the froth separated from the slurry streams by the plate members.

Froth separation plates 104 and 106 each include a respective upwardly inclined upstream section 108 and 110 and a respective downwardly inclined downstream section 112 and 114. Spray nozzles (not shown) may be provided in zones generally above linear joints 116 and 118 between upwardly inclined upstream plate sections 108 and 110, on the one side, and downwardly inclined downstream plate sections 112 and 114, on the other side. Downwardly inclined downstream plate sections 112 and 114 extend to respective froth inlets 120 and 122 to feedwell body 74.

At points below upwardly inclined upstream plate sections 108 and 110 discharge sections 88 and 90 of eductor feed channels 76 and 78 have closed upper ends so as to deflect the slurry or diluted thickener streams downwardly towards inlet portions 100 and 102.

Feedwell assembly 72 further includes (A) a first flocculent feed pipe 124 extending to inlet port sections 80 and 82 of eductor feed channels 76 and 78, (B) a second flocculent feed pipe 126 extending to middle sections 84 and 86 of eductor feed channels 76 and 78, (C) a third flocculent feed pipe 128 extending to feedwell body 74, and (D) a fourth flocculent feed pipe 130 extending to a clarifier feed pipe 132. As shown in FIG. 4, clarifier feed pipe 132 extends to a clarifier inlet port 134 on feedwell body 74.

Eductor feed channels 76 and 78 are connected at downstream ends to feedwell body 74 at locations spaced longitudinally and circumferentially along the body. Froth separation plates 104 and 106 are disposed in feed channels 76 and 78 so that upstream edges of the plates are disposed at or below operational liquid levels (slurry-froth interfaces) in the feed channels and so that at least a portion of each plate member 104 and 106 is disposed above the respective liquid level.

A method related to the apparatus of FIGS. 3-5 for reducing froth and air fed to feedwell 72 in a thickener/clarifier (not shown) comprises providing plates 104 and 106 and disposing the plates in feed channels 76 and 78 in positions and orientations for separating froth from incoming slurry streams. Plate 104 and 106 are attached in that position to channels 76 and 78, spray nozzles being positioned above the plates, particularly in exposed regions of plates. During operation of the feedwell assembly 72 (and the associated thickener/clarifier), thickener is introduced into inlet ports 80 and 82 from feed pipes 96 and 98 and accelerated along middle channel sections 84 and 86 so that froth along upper surface of the slurry streams is guided onto plates 104 and 106. A spray is ejected from nozzles (not shown) onto the froth on plates 104 and 106, thereby collapsing the froth into solids and liquid components and releasing air entrapped in the froth. The slurry is fed in together with the solids and liquid components of the collapsed froth through the discharge sections 88 and 90 of feed channels 76 and 78.

It is to be noted that a froth separation and dissipation plate member as disclosed herein may be horizontal, multi-angled, and/or variously inclined upwardly or downwardly at any number of different angles relative to the horizontal. In addition, the plate member may be adjustably mounted both to enable variation in the angle of inclination, as well as variation in the height or vertical location of the leading edge of the plate member, for instance, to enable positioning of the leading edge precisely at the froth-liquid interface.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facili-

What is claimed is:

1. A feedwell assembly for a thickener/clarifier, comprising:
   a feedwell body;
   a pair of infeed pipes connected at downstream ends to said body at locations spaced longitudinally and circumferentially along said body;
   a launder header, said infeed pipes being connected at upstream ends to said header; and
   a plate member disposed in said header at a level so that an upstream end of said plate member is disposed approximately at a froth-liquid interface of an incoming slurry stream.

2. The feedwell assembly defined in claim 1 wherein said plate member includes at least one planar plate section.

3. The feedwell assembly defined in claim 2 wherein said planar plate section is upwardly inclined in a downstream direction from said upstream end of said plate member.

4. The feedwell assembly defined in claim 3 wherein said plate member includes a second planar plate section inclined downwardly from a downstream end of said one planar plate section.

5. The feedwell assembly defined in claim 4 wherein said one planar plate section and second planar plate section meet along an elongate joint, at least one spray nozzle being disposed so as to direct a liquid spray onto at least a portion of said plate member in a region about said joint.

6. The feedwell assembly defined in claim 1, further comprising at least one spray nozzle disposed for directing a liquid spray onto at least a portion of said plate member to knock down or dissipate froth thereon.

7. The feedwell assembly defined in claim 1 wherein said feedwell body includes a lower portion and an upper portion, said upper portion having a larger transverse dimension that said lower portion, said infeed pipes being connected to said lower portion, said plate member extending to said upper portion.

8. The feedwell assembly defined in claim 1 wherein said plate member has a downstream portion disposed approximately at or above the level of said upstream end.

9. The feedwell assembly defined in claim 1 wherein said plate member is disposed in said header at least partially upstream of the upstream ends of said infeed pipes.

10. A feedwell assembly for a thickener/clarifier, comprising:
    a feedwell body;
    at least one feed channel having a downstream end connected to said body; and
    a plate member disposed in said feed channel at a level so that an upstream end of said plate member is disposed at approximately a froth-liquid interface of an incoming slurry stream.

11. The feedwell assembly defined in claim 10 wherein said plate member includes at least one planar plate section.

12. The feedwell assembly defined in claim 11 wherein said planar plate section is upwardly inclined in a downstream direction from an upstream end of said planar plate section.

13. The feedwell assembly defined in claim 12 wherein said plate member includes a second planar plate section inclined downwardly from a downstream end of said one planar plate section.

14. The feedwell assembly defined in claim 13 wherein said one planar plate section and second planar plate section meet along an elongate joint, at least one spray nozzle being disposed so as to direct a liquid spray onto at least a portion of said plate member in a region about said joint.

15. The feedwell assembly defined in claim 10, further comprising at least one spray nozzle disposed for directing a liquid spray onto at least a portion of said plate member to knock down or dissipate froth thereon.

16. The feedwell assembly defined in claim 10 wherein said feedwell body includes a lower portion and an upper portion, said upper portion having a larger transverse dimension than said lower portion, said feed channel being connected at least indirectly to said lower portion, said plate member extending toward said upper portion.

17. The feedwell assembly defined in claim 10, further comprising inlet portions extending from said feed channel to said feedwell body, said plate member being disposed at least partially upstream of said inlet portions.

18. A method for reducing froth and air fed to a feedwell in a thickener/clarifier, comprising:
    disposing, in a feed channel or launder header, a plate member in a position and orientation for separating froth from an incoming slurry stream;
    attaching said plate member in said position to said feed channel or launder header;
    flowing a slurry into said feed channel or launder header; and
    diverting the froth from along an upper surface of the slurry onto said plate member, while allowing slurry apart from the froth to flow through to the feedwell.

19. The method defined in claim 18 wherein the disposing of said plate member includes positioning said plate member so that an upstream end of said plate member is disposed approximately at a froth-liquid interface in said feed channel or launder header.

20. The method defined in claim 19 wherein the disposing of said plate member further includes positioning said plate member so that at least a portion of said plate member is disposed above a liquid level.

21. The method defined in claim 20 wherein the disposing of said plate member includes positioning said plate member so that an upstream portion is inclined upwardly from said upstream end of said plate member and a downstream portion of said plate member is inclined downwardly from a downstream end of said upstream portion.

22. The method defined in claim 21 wherein said upstream portion and said downstream portion of said plate member meet along an elongate joint, further comprising disposing a spray nozzle so as to enable a directing of a liquid spray onto at least a portion of said plate member in a region about said joint.

23. The method defined in claim 18, further comprising:
    disposing at least one spray nozzle above said plate member; and
    ejecting a spray from said nozzle onto the froth on at least a portion of said plate member, thereby collapsing the froth into solids and liquid components and releasing air entrapped in said froth.

* * * * *